US008989546B2

(12) United States Patent
Koreeda

(10) Patent No.: US 8,989,546 B2
(45) Date of Patent: Mar. 24, 2015

(54) POLISHING JIG, FERRULE, AND OPTICAL CONNECTOR

(75) Inventor: Yuichi Koreeda, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 420 days.

(21) Appl. No.: 13/375,571

(22) PCT Filed: May 12, 2010

(86) PCT No.: PCT/JP2010/057996
§ 371 (c)(1),
(2), (4) Date: Dec. 1, 2011

(87) PCT Pub. No.: WO2010/140449
PCT Pub. Date: Dec. 9, 2010

(65) Prior Publication Data
US 2012/0082419 A1    Apr. 5, 2012

(30) Foreign Application Priority Data
Jun. 3, 2009   (JP) .................. 2009-133601

(51) Int. Cl.
G02B 6/00 (2006.01)
B24B 19/22 (2006.01)
B24B 41/06 (2012.01)
G02B 6/38 (2006.01)

(52) U.S. Cl.
CPC ............ B24B 19/226 (2013.01); B24B 41/06 (2013.01); G02B 6/3863 (2013.01); G02B 6/3885 (2013.01)
USPC .......................................... 385/134; 385/85

(58) Field of Classification Search
None
See application file for complete search history.

(56) References Cited

U.S. PATENT DOCUMENTS

| 4,839,993 | A | * | 6/1989 | Masuko et al. ............. 451/283 |
| 5,463,709 | A | * | 10/1995 | Terao et al. .................. 385/85 |
| 5,640,475 | A | | 6/1997 | Takahashi |
| 5,666,449 | A | | 9/1997 | Sawae et al. |
| 6,808,444 | B1 | * | 10/2004 | Kuprin et al. ............... 451/292 |
| 6,896,418 | B1 | * | 5/2005 | Bradford et al. ............. 385/85 |
| 6,979,255 | B2 | * | 12/2005 | Yamada et al. .............. 451/364 |
| 2002/0031986 | A1 | | 3/2002 | Nishi et al. |
| 2002/0085815 | A1 | | 7/2002 | Shinagawa et al. |
| 2002/0126961 | A1 | | 9/2002 | Hirabayashi et al. |

(Continued)

FOREIGN PATENT DOCUMENTS

| JP | 62-92150 U | 6/1987 |
| JP | 8-192349 A | 7/1996 |
| JP | 08220381 A | 8/1996 |

(Continued)

OTHER PUBLICATIONS

English translation of written opinion for PCT/JP2010/057996, mailing date Jun. 8, 2010.*
Machine translation of detailed description of JP 8-192349 A (patent issued Jul. 1996).*
International Search Report dated Jun. 8, 2010 issued in International Appln. No. PCT/JP2010/057996.

*Primary Examiner* — Mike Stahl
(74) *Attorney, Agent, or Firm* — Holtz, Holtz, Goodman & Chick PC

(57) ABSTRACT

A polishing jig 10 includes a holding member 11 for holding a ferrule 31 when polishing a front end face of the ferrule 31. The holding member 11 is formed by a holding member body 12 having a through hole 121 through which the ferrule 31 is inserted, and protrusions 16 and 17 which are provided on an upper surface of the holding member body 12, for supporting a flange 33 of the ferrule 31 when the ferrule 31 is inserted into the through hole 121.

3 Claims, 6 Drawing Sheets

(56) References Cited

U.S. PATENT DOCUMENTS

| | | |
|---|---|---|
| 2003/0081909 A1 | 5/2003 | Taira |
| 2003/0210871 A1* | 11/2003 | Rosson et al. ................ 385/78 |
| 2003/0235374 A1* | 12/2003 | Luther et al. ................ 385/85 |
| 2004/0076377 A1 | 4/2004 | Mizukami et al. |
| 2011/0044589 A1* | 2/2011 | Takaoka et al. ............... 385/83 |
| 2013/0022317 A1* | 1/2013 | Norris et al. ................ 385/78 |

FOREIGN PATENT DOCUMENTS

| | | |
|---|---|---|
| JP | 2001-315047 A | 11/2001 |
| JP | 2002-31740 A * | 1/2002 |
| JP | 2002-341188 A | 11/2002 |

* cited by examiner

POLISHING JIG, FERRULE, AND OPTICAL CONNECTOR

This application is a U.S. National Phase Application under 35 USC 371 of International Application PCT/JP2010/057996 filed May 10, 2010.

TECHNICAL FIELD

The present invention relates to a polishing jig, a ferrule, and an optical connector.

BACKGROUND ART

Conventionally, there has been proposed a polishing device that polishes an end face of a ferrule of an optical connector (see Patent Literature 1 below).

This polishing device comprises a rotating polishing board, polishing paper, a ferrule-fixing section, and a rotating mechanism. The polishing paper is arranged on the rotating polishing board. Abrasive grains are fixed on the polishing paper. The ferrule-fixing section is formed with a through hole through which an optical connector is inserted.

The optical connector includes a ferrule and a rubber boot. The ferrule has a flange. When the ferrule is inserted through the through hole of the ferrule-fixing section, the flange is brought into abutment with a rim of the through hole. In this state, the ferrule is fixed to the ferrule-fixing section. Further, the ferrule has a plurality of optical fiber insertion holes. One end of each optical fiber is inserted through an associated one of the optical fiber insertion holes, and is fixed with glue. The rubber boot is mounted on a side of the optical connector opposite from an end face of the ferrule. The optical fibers are inserted through the rubber boot.

To polish the end face of the ferrule, first, the ferrule is inserted through the through hole of the ferrule-fixing section. When the ferrule is inserted through the through hole of the ferrule-fixing section, the flange of the ferrule is brought into abutment with the ferrule-fixing section.

Next, the ferrule-fixing section is lowered to press the end face of the ferrule against the polishing paper on the rotating polishing board which is being rotated.

As a result, the end face of the ferrule is polished by the polishing paper.

CITATION LIST

Patent Literature

[PTL 1] JP2002-341188 A

SUMMARY OF INVENTION

Technical Problem

Although in the above-described polishing device, the respective end faces of the ferrules of the plurality of optical connectors are sequentially polished, after the polishing of the end face of a ferrule of one optical connector is finished, it is necessary to perform an operation for eliminating dust, such as polishing dust, from the top of the ferrule-fixing section before polishing the end face of a ferrule of another optical connector. If this cleaning operation is not performed, the dust can be caught between the flange of the ferrule and the ferrule-fixing section, whereby the ferrule may be fixed in a state inclined with respect to the ferrule-fixing section, and hence there is a problem that the end face of the ferrule is obliquely polished.

The present invention has been made in view of these circumstances, and an object thereof is to provide a polishing jig, a ferrule, and an optical connector, which makes it possible to perform cleaning of the polishing jig which holds the ferrule of the optical connector, after a polishing operation.

Solution to Problem

To attain the above object, in a first aspect of the present invention, there is provided a polishing jig comprising a holding member for holding a ferrule when polishing a front end face of the ferrule, wherein the holding member includes a holding member body that has a through hole through which the ferrule is to be inserted, and a plurality of protrusions that are provided on an upper surface of the holding member body, wherein when the ferrule is inserted through the through hole, the plurality of protrusions are adapted to oppose a flange of the ferrule such that the flange is brought into contact only with respective upper surfaces of the plurality of protrusions of the holding member, and a gap is formed between the flange and the upper surface of the holding member body.

With the arrangement of this invention, the protrusions which support the flange of the ferrule when the ferrule is inserted through the through hole are provided on the upper surface of the holding member body. Therefore, the protrusions reduce the contact area between the polishing jig and the ferrule, and reduce the area of portions which require cleaning.

In a second aspect of the present invention, there is provided a polishing jig comprising a holding member for holding a ferrule when polishing a front end face of the ferrule, wherein the holding member includes a holding member body that has a through hole through which the ferrule is to be inserted, and a plurality of cutouts that are provided both in an upper surface of the holding member body that supports a flange of the ferrule when the ferrule is inserted into the through hole, and in an inner peripheral surface of the through hole of the holding member body, wherein the plurality of cutouts extend from the upper surface of the holding member body toward a lower surface of the holding member body such that when the ferrule is inserted into the through hole, the flange is brought into contact with only a portion of the upper surface of the holding member body, wherein the portion of the upper surface of the holding member body is smaller than a front surface of the flange which is opposed to the upper surface of the holding member body.

With the arrangement of this invention, the holding member has the cutouts formed in the upper surface of the holding member body which supports the flange of the ferrule when the ferrule is inserted through the through hole and in the inner peripheral surface of the through hole. Therefore, the cutouts reduce the contact area between the polishing jig and the ferrule, and reduce the area of portions which require cleaning.

Preferably, the cutouts reach the lower surface of the holding member body.

Advantageous Effects of Invention

According to the present invention, it is possible to easily perform cleaning the polishing jig after the polishing operation, which holds the ferrule of the optical connector.

DESCRIPTION OF EMBODIMENTS

Hereafter, embodiments of the present invention will be described with reference to the drawings.

Figure 1:
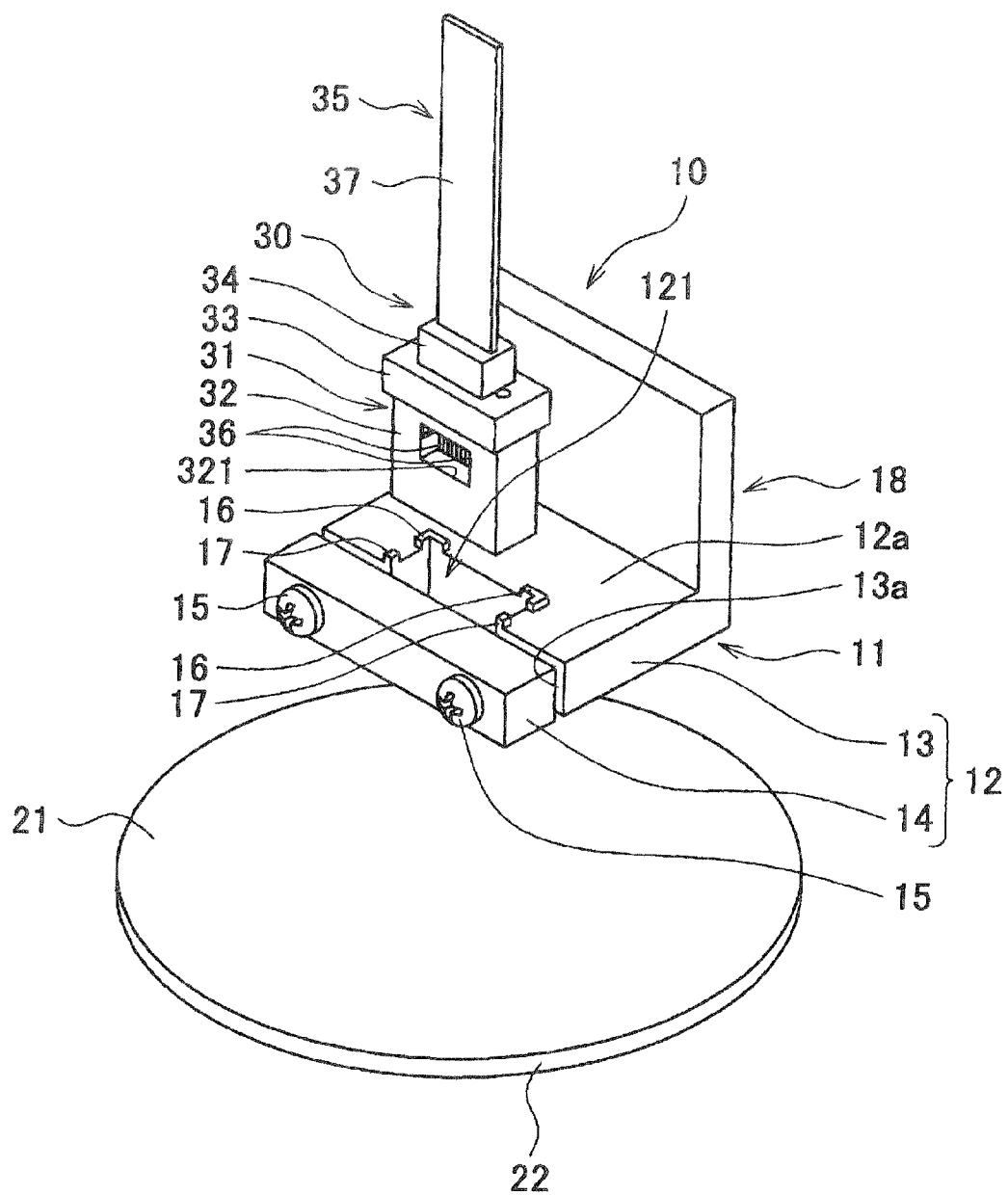
FIG. 1 is a perspective view of a polishing jig according to a first embodiment of the present invention in a state before mounting an optical connector.
Figure 2:
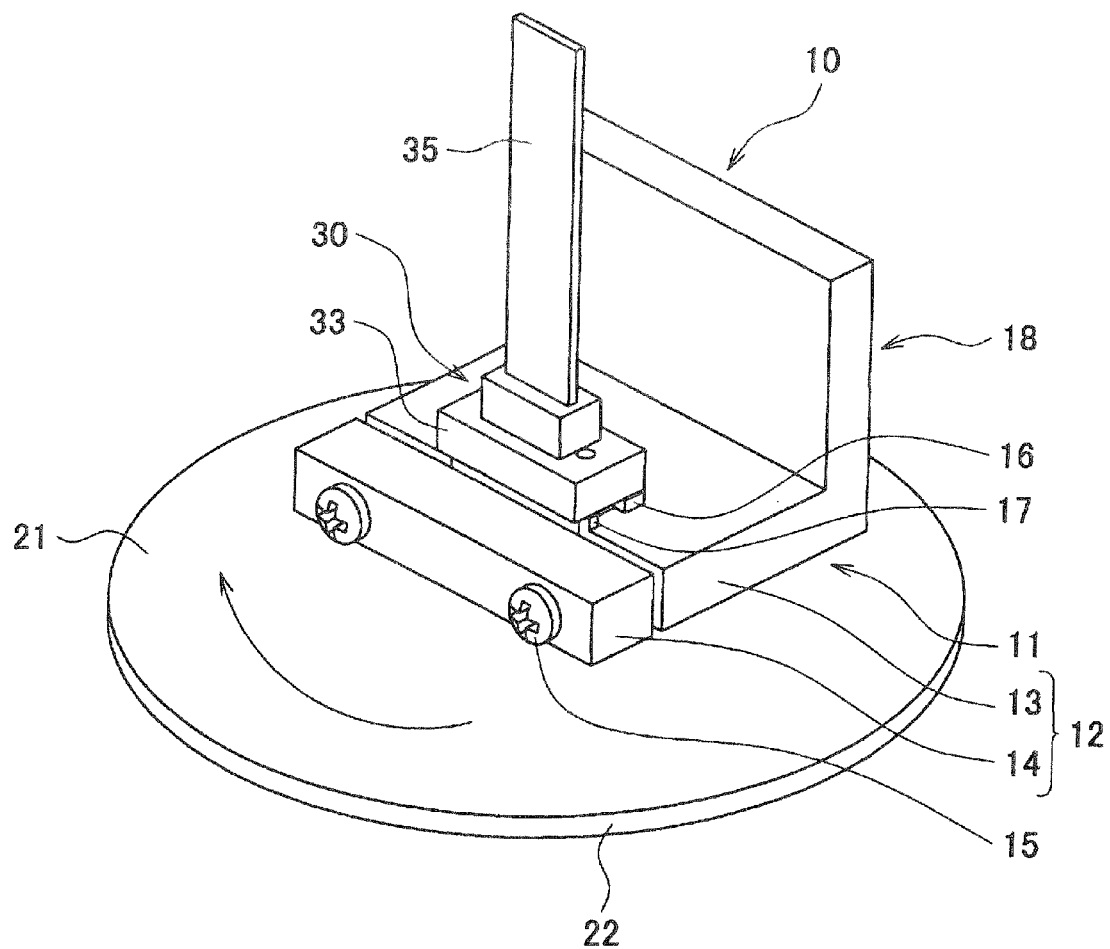
FIG. 2 is a perspective view of the polishing jig shown in FIG. 1 in a state of use.

As shown in FIGS. 1 and 2, a polishing jig 10 according to a first embodiment of the present invention includes a holding member 11, and a linking member 18. When polishing a front end face 31a (see FIG. 3) of a ferrule 31 of an optical connector 30, the holding member 11 holds the ferrule 31.

The holding member 11 includes a holding member body 12, and protrusions 16 and 17 provided on an upper surface of the holding member body 12. The holding member body 12 has a through hole 121 having a rectangular shape in plan view through which the ferrule 31 of the optical connector 30 is inserted. The holding member body 12 includes a first plate member 13 and a second plate member 14. The four protrusions 16 and 17 are arranged in four corners of the through hole 121, respectively, in a manner adjacent to each other. The four protrusions 16 and 17 are located on an upper surface of the first plate member 13. The protrusions 16 and 17 support a flange 33 of the ferrule 31 of the optical connector 30 inserted through the through hole 121 (see FIG. 2). The first plate member 13 has two screw holes, not shown, formed in a front 13a thereof, for having two bolts 15 screwed therein. The second plate member 14 has two bolt insertion holes (not shown) formed therein, which are associated with the two screw holes of the first plate member 13, respectively. When the two bolts 15 are inserted through the two bolt insertion holes of the second plate member 14, and then are screwed into the two screw holes of the first plate member 13, a gap between the first plate member 13 and the second plate member 14 is reduced, and hence the ferrule 31 of the optical connector 30 inserted through the through hole 121 is sandwiched by the first plate member 13 and the second plate member 14, and is held by the holding member body 12.

The linking member 18 is plate-shaped, and continues at right angles to one side of the first plate member 13. The linking member 18 is linked to a movable section of a polishing device, not shown. The movable section moves up and down along a direction of a vertical line. A polishing paper 21 is affixed to an upper surface of a rotation board 22 of the polishing device.

The optical connector 30 comprises the ferrule 31, and a boot 34.

The ferrule 31 includes a ferrule body 32 and the flange 33. As a material of the ferrule 31, there may be mentioned e.g. zirconia. The ferrule body 32 is box-shaped, and can be inserted through the through hole 121 of the polishing jig 10. The boot 34 for holding an optical fiber cable 35 is mounted to the ferrule body 32. The boot 34 is formed of a material having flexibility. The ferrule body 32 is provided with a glue injection hole 321 and a wire insertion hole (not shown). The glue injection hole 321 and the wire insertion hole communicate with an inner space within the ferrule body 32.

The flange 33 is provided on an outer peripheral surface of the ferrule body 32.

The optical fiber cable 35 includes a plurality of optical fiber wires 36 and a cover 37 for covering the optical fiber wires 36. The optical fiber wires 36 are each formed by a core, not shown, and a cladding for covering the core. The cover 37 of a front end portion of the optical fiber cable 35 is removed, and the optical fiber wires 36 are inserted through the wire insertion hole of the ferrule 31. A front end face of each optical fiber wire 36 reaches the front end face 31a of the ferrule 31. The plurality of optical fiber wires 36 within the ferrule 31 are fixed with glue injected from the glue injection hole 321.

Next, a description will be given an operation for polishing the front end face 31a of the ferrule 31 of the optical connector 30 using the polishing jig 10.

First, the bolts 15 are loosened to increase the space between the first plate member 13 and the second plate member 14, as shown in FIG. 1.

Next, the ferrule 31 of the optical connector 30 is inserted through the through hole 121 of the polishing jig 10 (see FIG. 2). When the ferrule 31 is inserted through the through hole 121 of the polishing jig 10, the flange 33 of the ferrule 31 is supported by the protrusions 16 and 17 of the polishing jig 10. At this time, the flange 33 of the ferrule 31 is brought into contact only with respective upper surfaces of the protrusions 16 and 17, and hence even when dust such as polishing dust and foreign particles (hereinafter referred to as the dust etc.) exists on an upper surface 12a of the holding member body 12 of the polishing jig 10, the ferrule 31 is never inclined due to the dust etc. caught between the ferrule 31 and the holding member body 12 unless the dust etc. is larger than the height of the protrusions 16 and 17.

After the ferrule 31 has been inserted through the through hole 121, the bolts 15 are fastened. As a result, the ferrule 31 is rigidly sandwiched between the second plate member 14 and the first plate member 13, whereby the optical connector 30 is fixed to the polishing jig 10.

Figure 3:
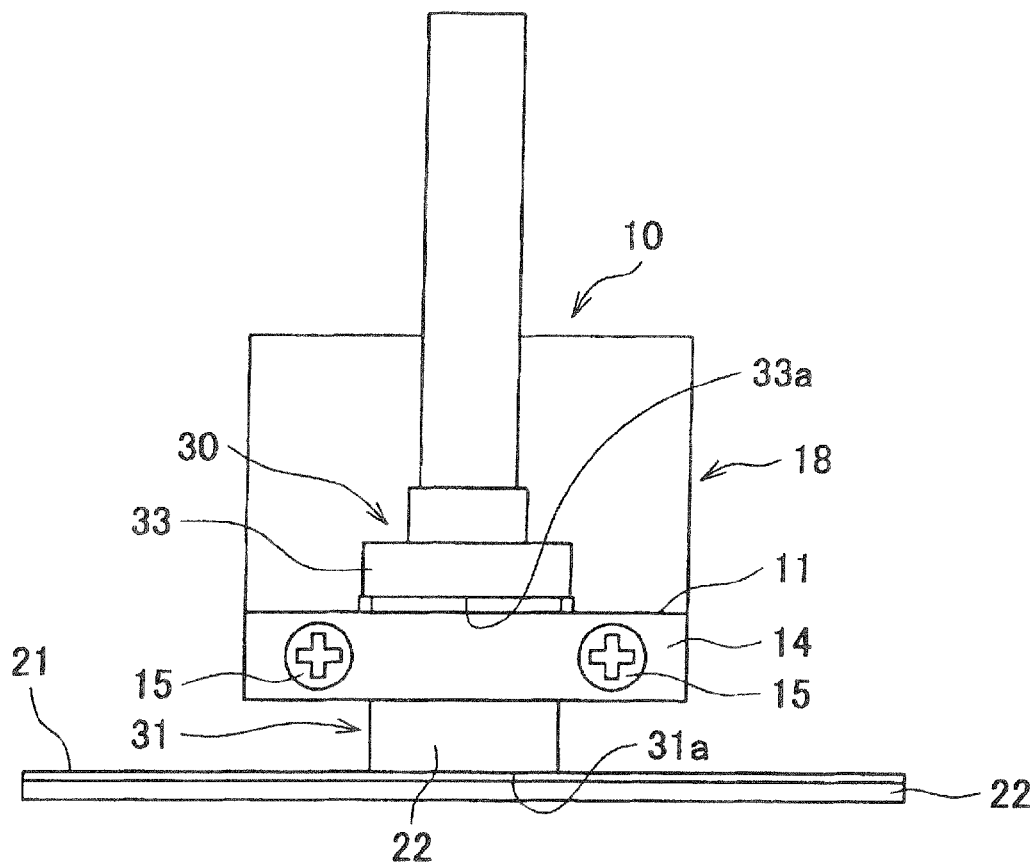
FIG. 3 is a front view of the polishing jig shown in FIG. 1 in a state of use.

Next, the rotation board 22 of the polishing device is rotated to progressively lower the movable section of the polishing device while supplying polishing solution to the polishing paper 21 on the rotation board 22. As a result, as shown in FIG. 3, the ferrule 31 of the optical connector 30 is pressed against the polishing paper 21, whereby the front end face 31a of the ferrule 31 is polished, and the front end face of each optical fiber wire 36 is also polished.

After the polishing operation has been finished, the bolts 15 are loosened to remove the optical connector 30 from the polishing jig 10.

Finally, the polishing jig 10 is cleaned to eliminate the dust etc. At this time, although it is necessary to carefully clean the upper surfaces of the protrusions 16 and 17, it is not necessary to carefully clean the other parts.

According to the first embodiment, it is only necessary to carefully clean the upper surfaces of the protrusions 16 and 17 of the polishing jig 10 after the operation for polishing the ferrule 31 of the optical connector 30, which makes it possible to easily perform an operation for cleaning the polishing jig 10.

Note that as a variation of the first embodiment, the through hole 121 of the polishing jig 10 may be formed with cutouts in an inner peripheral surface thereof, which extend from the upper surface 12a of the holding member body 12 to the lower surface of the same (e.g. cutouts 2132 and 2133 of a polishing jig 210 according to a second embodiment, described hereinafter).

Figure 4:
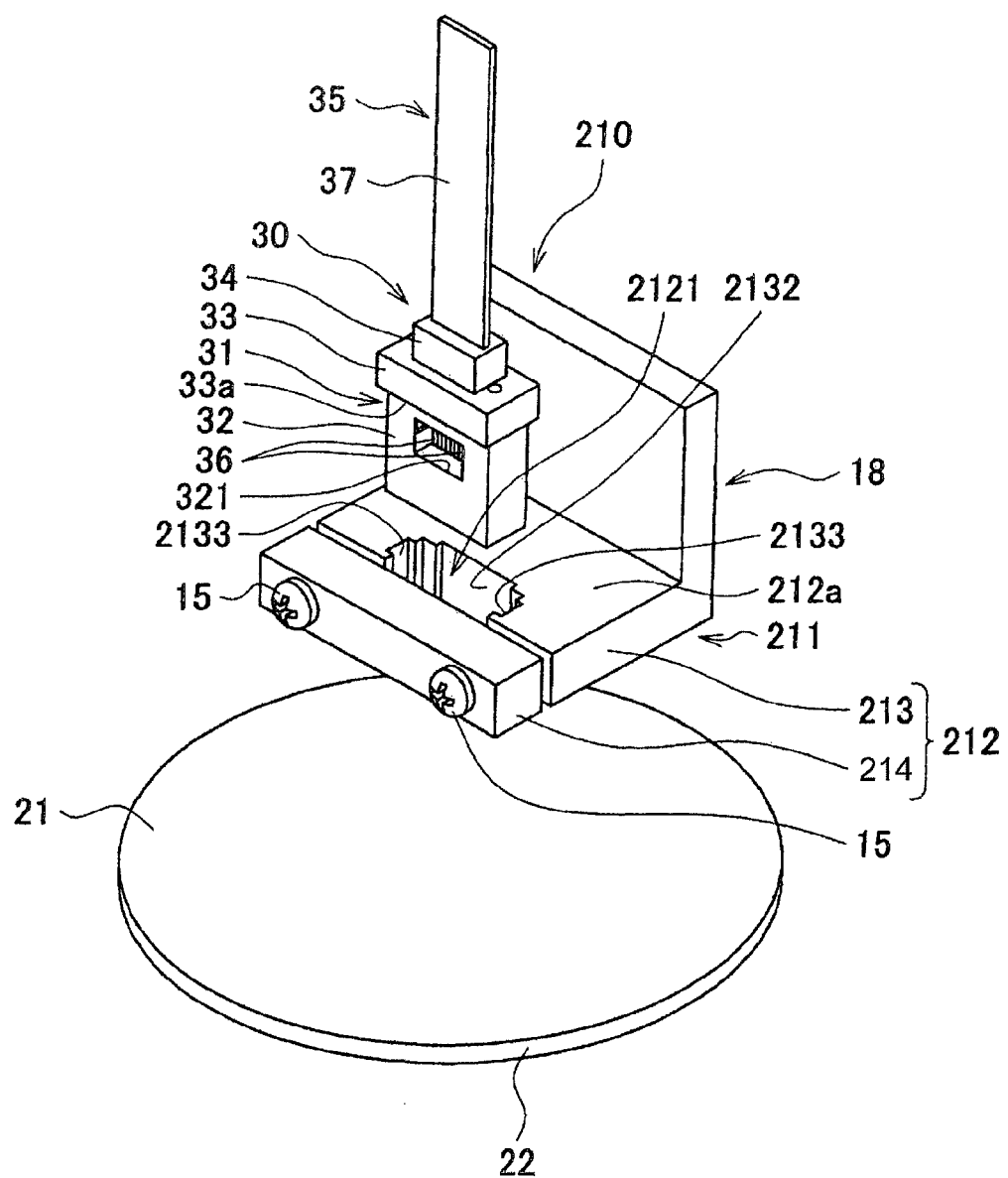
FIG. 4 is a perspective view of a polishing jig according to a second embodiment of the present invention in a state before mounting an optical connector.

Next, a description will be given of the polishing jig 210 according to the second embodiment of the present invention with reference to FIG. 4. Component parts identical to those of the polishing jig according to the first embodiment are designated by identical reference numerals, and detailed description thereof is omitted.

In the first embodiment, the protrusions 16 and 17 are provided on the upper surface 12a of the holding member body 12 of the polishing jig 10 to support four corners of a front surface 33a of the flange 33 of the optical connector 30. As distinct therefrom, in the second embodiment, as shown in FIG. 4, a through hole 2121 of a holding member body 212 (which includes a first plate member 213 and a second plate member 214) is formed with the plurality of cutouts 2132 and 2133 in the inner peripheral surface thereof and the four corners of the front surface 33a of the flange 33 are supported by an upper surface 212a of the holding member body 212.

The cutouts 2132 and 2133 are cutouts which extend from the upper surface 212a of the holding member body 212 toward a lower surface of the same.

According to the second embodiment, it is possible to obtain the same advantageous effect as provided by the first embodiment, and since the cutouts 2132 and 2133 are cutouts which extend from the upper surface 212a of the holding member body 212 to the lower surface thereof, if only four portions of the upper surface 212a of the holding member body 212 where the four corners of the front surface 33a of the flange 33 are supported are cleaned, the ferrule 31 of the optical connector 30 is never inclined due to the dust caught between the flange 33a and the holding member body 212.

Note that although in the second embodiment, the cutouts 2132 and 2133 extend from the upper surface 212a of the holding member body 212 to the lower surface of the same, as a variation of the second embodiment, cutouts (not shown) which extend from the upper surface 212a of the holding member body 212 but do not reach the lower surface thereof may be provided in place of the cutouts 2132 and 2133.

Further, as a variation of the second embodiment, the same protrusions (not shown) as those in the first embodiment, which support the front surface 33a of the flange 33, may be provided on the upper surface 212a of the holding member body 212.

Figure 5:
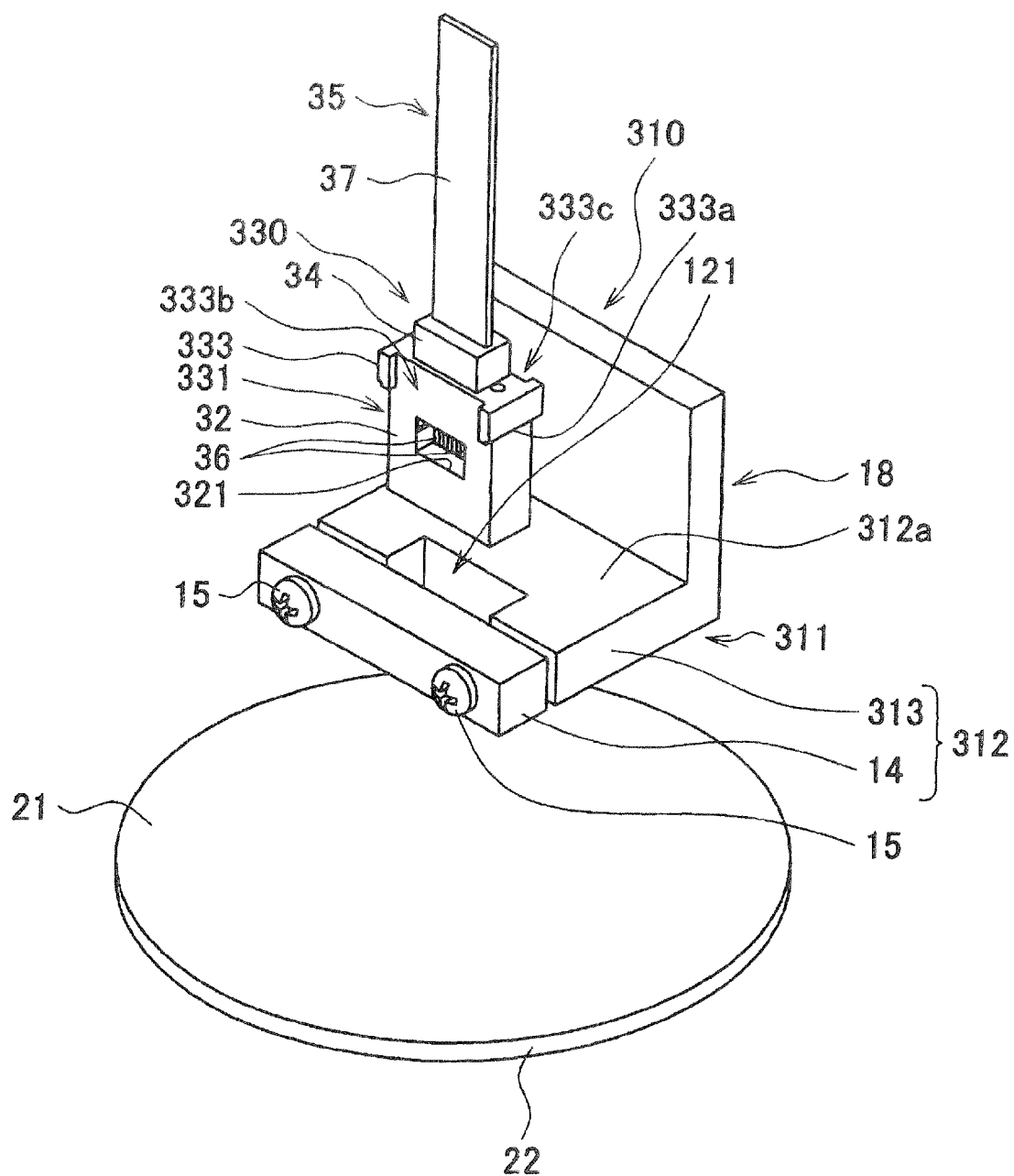
FIG. 5 is a perspective view of a polishing jig according to a third embodiment of the present invention in a state before mounting an optical connector.

Next, a description will be given of an optical connector 330 according to a third embodiment of the present invention with reference to FIG. 5. Component parts identical to those of the connector 30 shown in FIG. 1 are designated by identical reference numerals, and detailed description thereof is omitted.

In the first and second embodiments, the protrusions 16 and 17 and the cutouts 2132 and 2133 are provided on and in the holding member bodies 12 and 212 of the polishing jigs 10 and 210, respectively, to reduce the contact area between the flange 33 of the ferrule 31 of the optical connector 30 and each of the holding member bodies 12 and 212. On the other hand, in the third embodiment, as shown in FIG. 5, two cutouts 333b and 333c are formed in a flange 333 of a ferrule 331 of the optical connector 330 to reduce a contact area between the flange 333 and a holding member body 312 of a polishing jig 310.

The cutouts 333b and 333c are cutouts which extend from a front surface 333a of the flange 333 to a rear surface of the same.

Note that the polishing jig 310 has an arrangement formed by eliminating the protrusions 16 and 17 from the holding member body 12 of the polishing jig 10 shown in FIG. 1.

According to the third embodiment, it is possible to obtain the same advantageous effect as provided by the second embodiment.

Although in the third embodiment, the cutouts 333b and 333c provided in the flange 333 extend from the front surface 333a of the flange 333 to the rear surface of the same, there may be employed cutouts which extend from the front surface 333a of the flange 333 but do not reach the rear surface thereof, as a variation of the third embodiment.

Further, as a variation of the third embodiment, the front surface 333a of the flange 333 may be provided with protrusions (e.g. protrusions 433b of a flange 433 of an optical connector 430 according to a fourth embodiment, described hereinafter) which are brought into abutment with an upper surface 312a of the holding member body 312 of the polishing jig 310 when the ferrule 331 is inserted through the through hole 121. Note that in the third embodiment, the two cutouts 333b and 333c are provided in the front surface 333a of the flange 333. The cutouts 333b and 333c are located at the front and rear of the flange 333 (see FIG. 5), respectively, and both of the cutouts 333b and 333c extend from the front surface 333a of the flange 333 to the rear surface of the same (see FIG. 5). As a variation of the third embodiment, the front surface 333a of the flange 333 may be provided with four cutouts (not shown). The four cutouts are located at the front, rear, and opposite sides of the flange 333, respectively, and all of the cutouts each extend from the front surface 333a of the flange 333 to the rear surface of the same.

Figure 6:
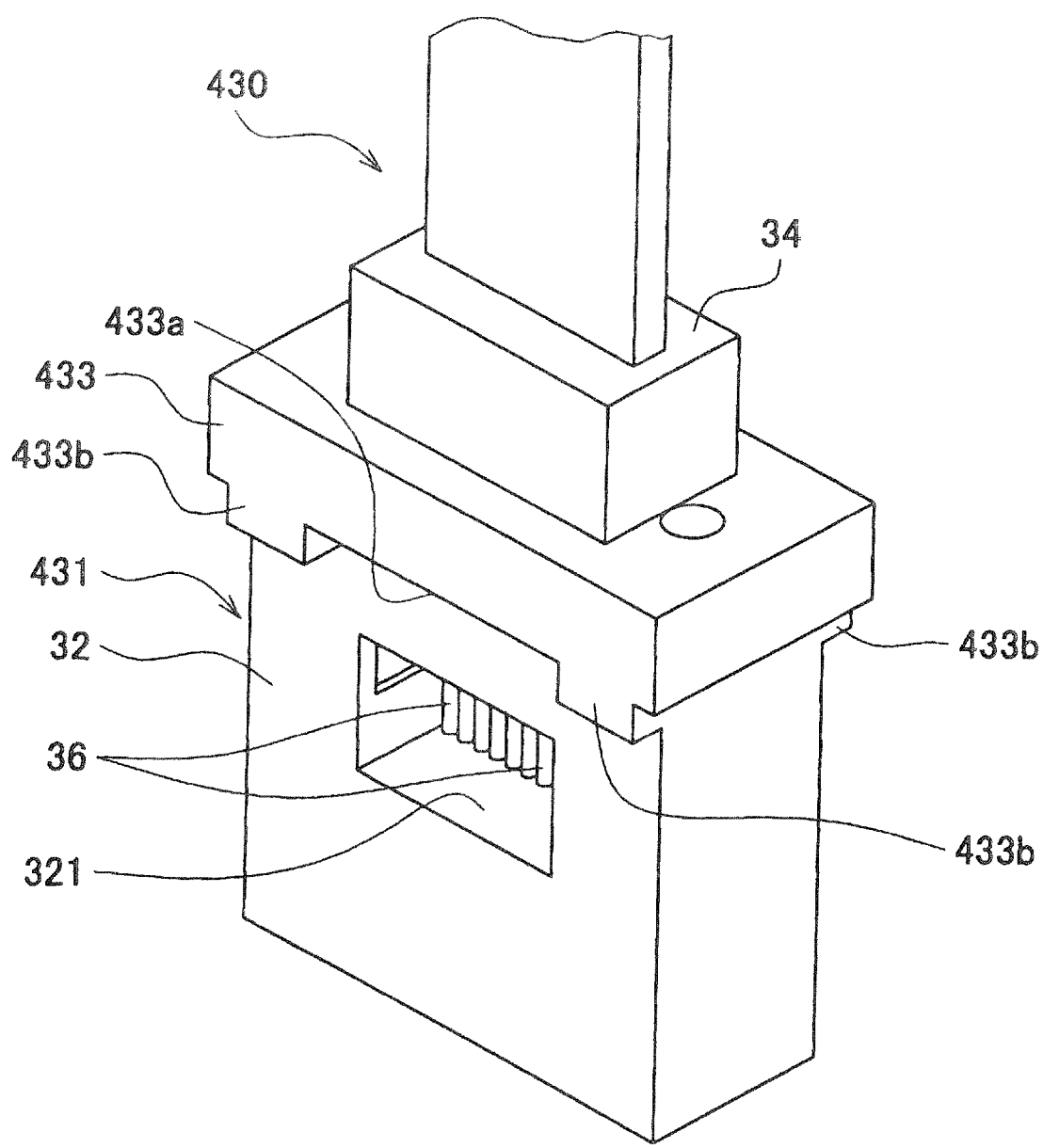
FIG. 6 is a perspective view of an optical connector according to a fourth embodiment of the present invention.

Next, a description will be given of the optical connector 430 according to the fourth embodiment of the present invention with reference to FIG. 6. Component parts identical to those of the connector 330 shown in FIG. 5 are designated by identical reference numerals, and detailed description thereof is omitted.

In the optical connector 330 according to the third embodiment, the cutouts 333b and 333c are provided in the flange 333 of the ferrule 331 to reduce the contact area between the flange 333 and the holding member body 312. As distinct therefrom, in the optical connector 430 according to the fourth embodiment, the four protrusions 433b are provided on four places on a front surface 433a of the flange 433 of a ferrule 431, respectively, to reduce a contact area between the flange 433 and the holding member body 312 (see FIG. 5).

According to the fourth embodiment, it is possible to obtain the same advantageous effect as provided by the first embodiment.

Note that as a variation of the fourth embodiment, an outer periphery surface of the flange 433 may be provided with cutouts (not shown) similar to those provided in the third embodiment, which extend from the front surface 433a of the flange 433 to a rear surface of the same.

It is further understood by those skilled in the art that the foregoing are the preferred embodiments of the present invention, and that various changes and modification may be made thereto without departing from the spirit and scope thereof.

REFERENCE SIGNS LIST 10, 210 polishing jig
11, 211 holding member
12, 212, 312 holding member body
12a, 212a, 312a upper surface of the holding member body
121, 2121 through hole 16, 17 protrusion
2132, 2133 cutout
31, 331, 431 ferrule
31a front end face
32 ferrule body
33, 333, 433 flange
33a, 333a, 433a front surface of the flange
333b, 333c cutout
433b protrusion

The invention claimed is:
1. A polishing jig comprising:
a holding member which is adapted to hold a ferrule when polishing a front end face of the ferrule,
wherein said holding member includes: (i) a holding member body that has a through hole through which the ferrule is to be inserted, and (ii) a plurality of protrusions that are provided on an upper surface of said holding member body, wherein when the ferrule is inserted through the through hole, the plurality of protrusions are adapted to oppose a flange of the ferrule such that the flange is brought into contact only with respective upper surfaces of the plurality of protrusions of the holding member, and a gap is formed between the flange and the upper surface of said holding member body.
2. A polishing jig comprising:
a holding member which is adapted to hold a ferrule when polishing a front end face of the ferrule,
wherein said holding member includes: (i) a holding member body that has a through hole through which the ferrule is to be inserted, and (ii) a plurality of cutouts that are provided both in an upper surface of said holding member body which is adapted to support a flange of the ferrule when the ferrule is inserted into the through hole, and in an inner peripheral surface of the through hole of said holding member body, wherein the plurality of cutouts extend from the upper surface of said holding member body toward a lower surface of said holding member body such that when the ferrule is inserted into the through hole, the flange is brought into contact with only a portion of the upper surface of the holding member body, wherein the portion of the upper surface of the holding member body is smaller than a front surface of the flange which is opposed to the upper surface of said holding member body,
wherein regions of the inner peripheral surface of the through hole in which the plurality of cutouts are formed are wider than regions of the inner peripheral surface in which no cutouts are formed.
3. The polishing jig as claimed in claim 2, wherein the plurality of cutouts extend from the upper surface of said holding member body toward the lower surface of said holding member body such that the plurality of cutouts reach the lower surface of said holding member body.

* * * * *

UNITED STATES PATENT AND TRADEMARK OFFICE
CERTIFICATE OF CORRECTION

PATENT NO. : 8,989,546 B2  Page 1 of 1
APPLICATION NO. : 13/375571
DATED : March 24, 2015
INVENTOR(S) : Yuichi Koreeda It is certified that error appears in the above-identified patent and that said Letters Patent is hereby corrected as shown below:

In the Specification

Column 1, Line 6, delete "May 10, 2010" and insert --May 12, 2010--.

Signed and Sealed this
Twenty-ninth Day of September, 2015

Michelle K. Lee
*Director of the United States Patent and Trademark Office*